June 4, 1968  C. H. BETJEMANN  3,386,600
DEMOUNTABLE SHIPPING GONDOLAS

Filed Sept. 26, 1966  3 Sheets-Sheet 1

INVENTOR.
CHRISTOPHER H. BETJEMANN
BY
ATTORNEY

June 4, 1968  C. H. BETJEMANN  3,386,600
DEMOUNTABLE SHIPPING GONDOLAS
Filed Sept. 26, 1966  3 Sheets-Sheet 2
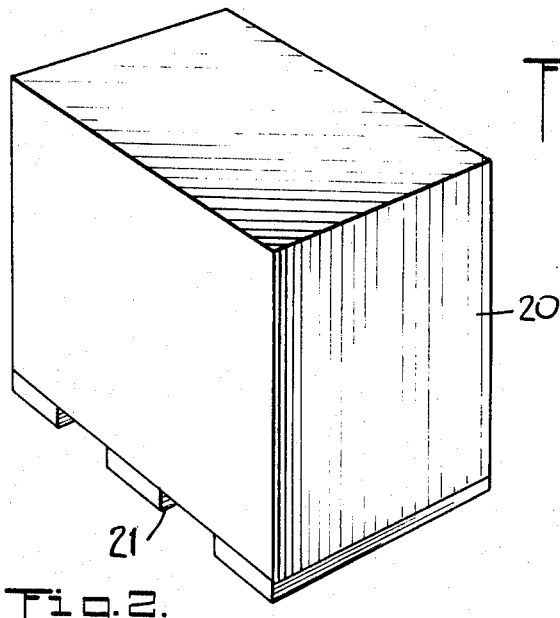
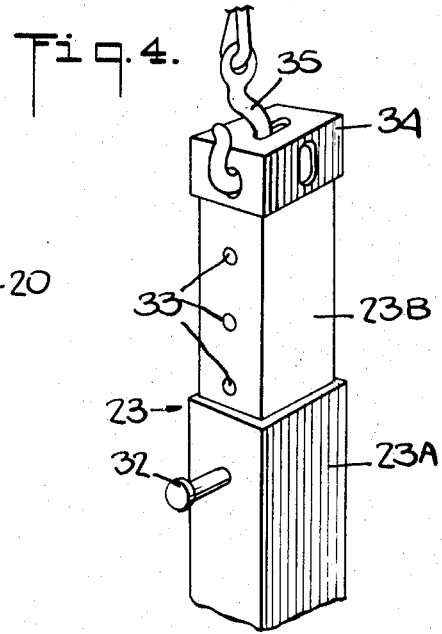
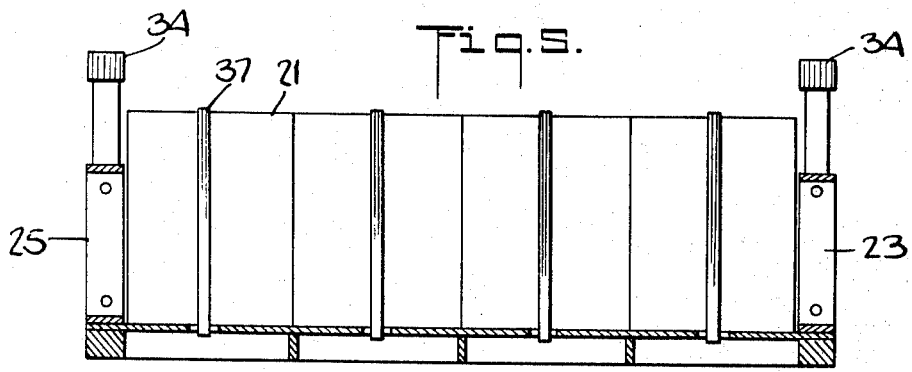
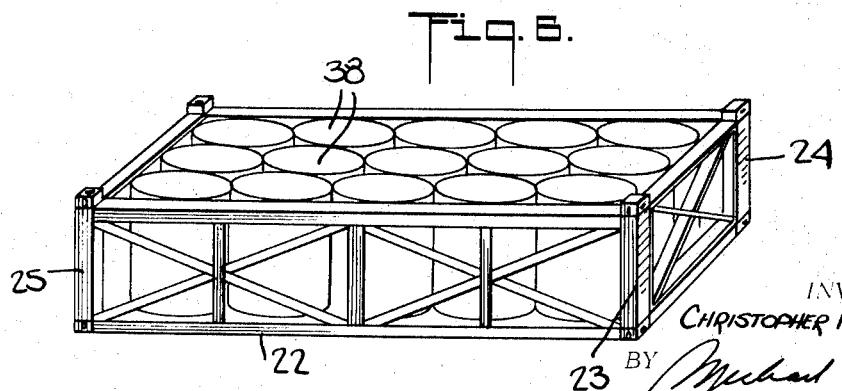
INVENTOR.
CHRISTOPHER H. BETJEMANN
BY
ATTORNEY June 4, 1968  C. H. BETJEMANN  3,386,600
DEMOUNTABLE SHIPPING GONDOLAS
Filed Sept. 26, 1966  3 Sheets-Sheet 3
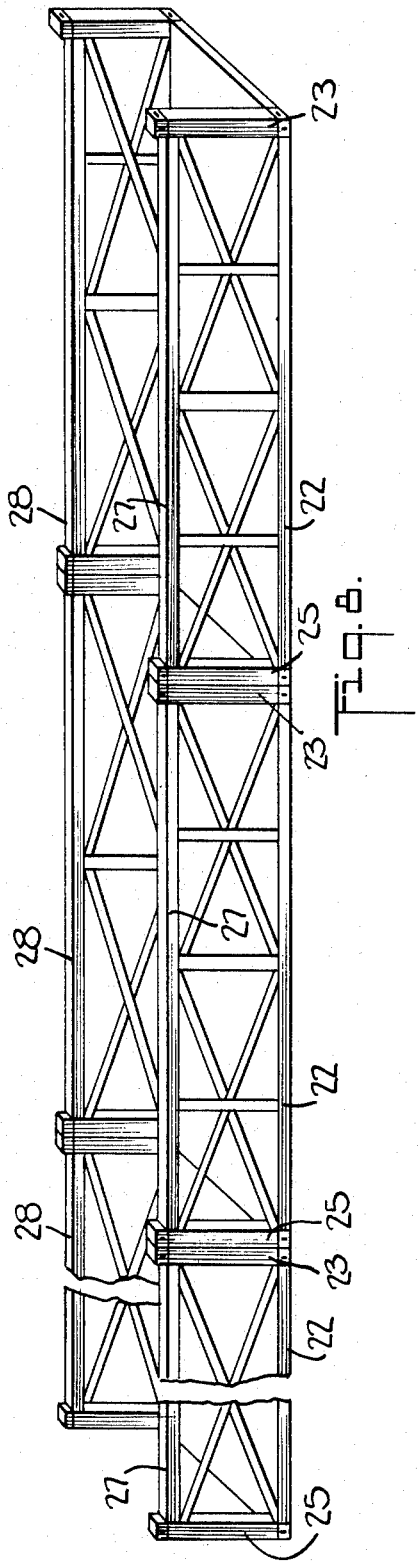
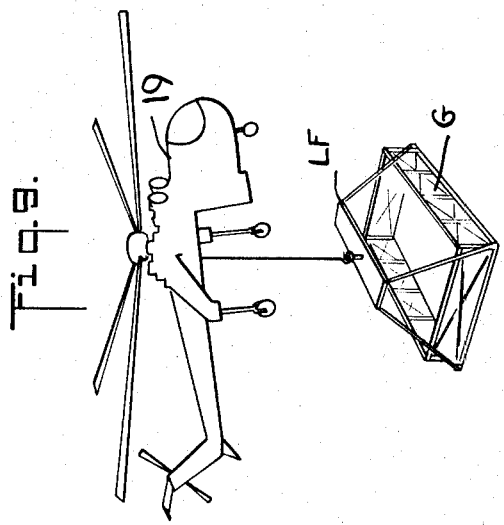
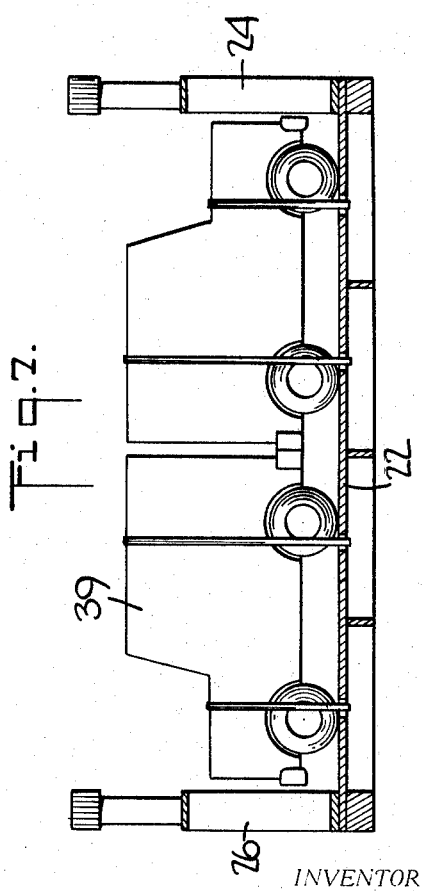
INVENTOR.
CHRISTOPHER H. BETJEMANN
BY
ATTORNEY

United States Patent Office 3,386,600
Patented June 4, 1968

3,386,600
DEMOUNTABLE SHIPPING GONDOLAS
Christopher H. Betjemann, Rte. 1,
Lambertville, N.J. 08530
Filed Sept. 26, 1966, Ser. No. 581,905
9 Claims. (Cl. 214—15)

ABSTRACT OF THE DISCLOSURE

This invention relates generally to shipping containers and more particularly to a demountable shipping gondola of adjustable height which is adapted to accommodate uncrated cargo, such as jeeps and ambulances, as well as smaller container units.

---

Increasing use is being made in the United States and in highly developed foreign countries of the containership concept. A containership is designed to receive and transport hundreds of standardized demountable cargo containers which may be loaded on or discharged from the vessel in a matter of minutes, thereby effecting significant economies in time and in cargo handling costs. Huge trailers are now available for transporting such cargo containers to and from docking facilities, over superhighways and turnpikes, thus providing a fully integrated mode of transportation.

Essential to the containership concept is the cargo container which is a shipping box suitable for storing and transporting bulk material, packages and pieces, as well as a number of smaller containers, the cargo container protecting the contents thereof from loss or damage and being large enough to entail mechanical handling. A cargo container is said to be demountable when it can be handled in transit as a unit and when it can be mounted and secured in or on marine, rail, highway or air carriers.

Demountable cargo containers have been standardized as to their height and width, but they may vary in length. Thus standard containers are eight feet in width and eight feet in height, whereas their length lies modularly in the range of 10 to 40 feet. But for containerships, cargo containers have been standardized in 20 feet lengths. Such containers are of rugged construction, for they must have sufficient structural strength to withstand, without permanent deformation, the static and dynamic loads imposed by pick-up and stacking operations and the impact shock and stresses encountered in normal carrier service.

Demountable cargo containers are provided with top corner fittings having end, side and top openings adapted to accept standard hooks, shackles, slings or other engaging hardware elements for registering, picking up and securing containers on railroad flatcars, highway vehicles, ships' decks and hatches, as well as in aircraft. The bottom corners are also provided with fittings, these having end, side and bottom openings suitable for engagement with lifting devices as well as with registering and securing devices. In order to facilitate vertical stacking of the containers, the bottom corner fittings must be compatible with the top corner fittings.

In technologically advanced countries having modern ports and superhighway systems, the containership concept bids fair to supplant older non-integrated shipping techniques, but in less developed countries lacking such facilities, demountable cargo containers cannot be brought into or out of the immediate port area for neither roads nor equipment are available for this purpose. Under these circumstances, the containership concept loses its real effectiveness as an integrated means of through transportation.

In those countries in South America, Africa and Asia where superhighways and trailers are non-existent, goods are currently transported by small truck, boats, or in whatever other conveyances are available, the goods being transported in relatively small units, such as boxes, crates or cans whose dimensions are usually such as to permit manual handling. But cargo in this form cannot be loaded on containerships, for the holds of such ships have a cellular construction which is designed to stow cargo containers of standard dimensions.

Accordingly, it is the main object of this invention to provide a demountable cargo gondola which can be mechanically handled and stacked in containerships, and which can be unloaded therefrom by means presently in use in conjunction with standard cargo containers, the gondola being adapted to cradle smaller container units or uncrated material, whereby a modern containership operation may be coordinated with relatively backward means of transportation.

A salient feature of the invention is that in place of standard cargo containers as the shipping unit, the containership is serviced by demountable gondolas which make it possible to reduce the shipping unit down to the level of the existing transportation facilities, whether by truck, air or even small boats.

Also an object of the invention is to provide a cargo gondola which is adapted to be moved by "flying cranes" or freight helicopters whereby the gondola and the cargo therein may be taken from the containership and brought directly to its destination or to a marshalling area where the cargo which takes the form of small units may be loaded on whatever vehicles are there available.

More specifically it is an object of the invention to provide a demountable cargo gondola having removable end gates to facilitate the entry and exit of small shipping units, the gondola including corner posts having top and bottom corner fittings, the posts being extensible in height, whereby the dimensions of the gondola may be conformed to that of the cargo elements cradled therein.

Another significant advantage of the invention is that gondolas may be aligned in tandem relation with their end gates removed, thereby defining an unobstructed channel through which goods may be loaded or unloaded by fork-lift truck or other means.

Briefly stated these objects are accomplished in a demountable cargo gondola having a rectangular floor to which is secured four hollow corner posts provided with bottom corner fittings adapted to accommodate hooks and other engaging hardware. Between each pair of posts at either end of the gondola there is disposed a removable end gate, whereas between each pair of posts at either side of the gondola there is fixedly mounted a side wall, the gates and walls being of substantially the same height as that of the posts. Telescopically received within the corner posts are extensible sections terminating in top corner fittings, means being provided to latch these sections at any desired raised position, whereby the effective height of the corner posts may be adjusted to conform to the height of the load cradled in the gondola.

For a better understanding of the invention as well as other objects and further features thereof, reference is made to the following detailed description to be read in conjunction with the accompanying drawings wherein:

FIG. 3 is a perspective view of a gondola in accordance with the invention;

FIG. 4 separately shows one of the extensible corner posts;

FIG. 5 shows in side view a load of such small cargo container units cradled within the gondola;

FIG. 6 shows a load of oil cans cradled on a gondola;

FIG. 7 shows two automobiles cradled on a gondola;

FIG. 8 shows several gondolas in tandem, and

FIG. 9 illustrates a flying crane carrying a gondola.

Figure 1:
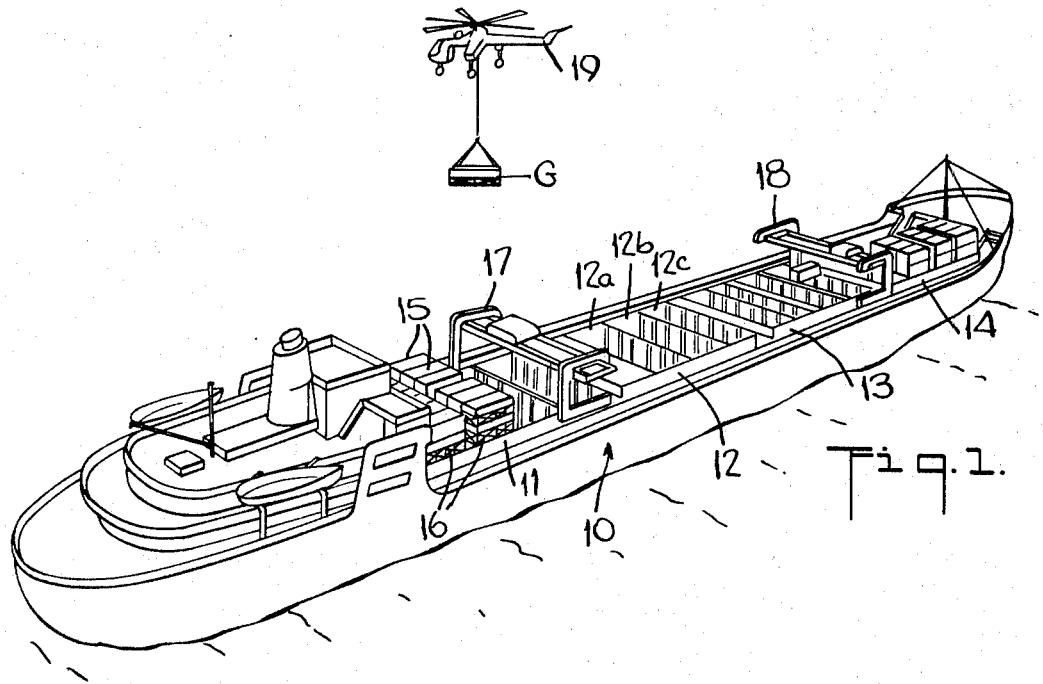
FIG. 1 illustrates in perspective a container-ship for standard cargo containers or for demountable cargo gondolas in accordance with the invention, the ship being unloaded by a freight helicopter.

Referring now to the drawing, and more particularly to FIG. 1, there is shown an existing form of containership, generally designated by numeral 10, the hold of which is divided into major sections or compartments 11, 12, 13 and 14. Each of these compartments is arranged by means of suitable horizontal spacer elements and vertical beams into a multiplicity of individual cells, such as cells 12a, 12b and 12c formed in compartment 12. The cells are dimensioned to receive standard demountable cargo containers, such as containers 15. The same cells are adapted to accommodate gondolas G in accordance with the invention, which gondolas have width and length dimensions corresponding to those of standard containers. It is to be noted that the gondolas G and containers 15 are vertically stacked in the individual cells.

Both the gondolas and containers incorporate top and bottom corner fittings, preferably of the type now standardized by the American Standards Association or by international standards organizations. These fittings include openings designed to accept hooks, shackles, slings and other forms of engaging pick-up hardware mounted on spreaders for manual, semi-automatic or automatic handling, in the manner shown for example in the specifications for cargo containers published by the American Standards Association.

It will be seen that containership 10 is equipped with two traveling gantry cranes 17 and 18, which ride on rails running parallel to the hold compartments. Each crane includes a transversely movable overhead trolley hoist which can be aligned with any cell therebelow for loading or unloading containers and gondolas. Rapid discharge may also be effected by a cargo helicopter 19. Such helicopters, one of which is shown separately in FIG. 9 are commonly known as flying cranes, and are capable of moving very heavy loads. By the use of appropriate engaging hardware, gondolas and containers can be removed from the vessel by a flying crane and flown away from shipside as rapidly as the vessel can effect discharge. In practice, a container or gondola may be withdrawn from its cell and placed on the ship's deck by the traveling gantry crane, and then lifted from the deck by a flying crane, to be flown inland to a marshalling area or to any other destination.

Figure 2:
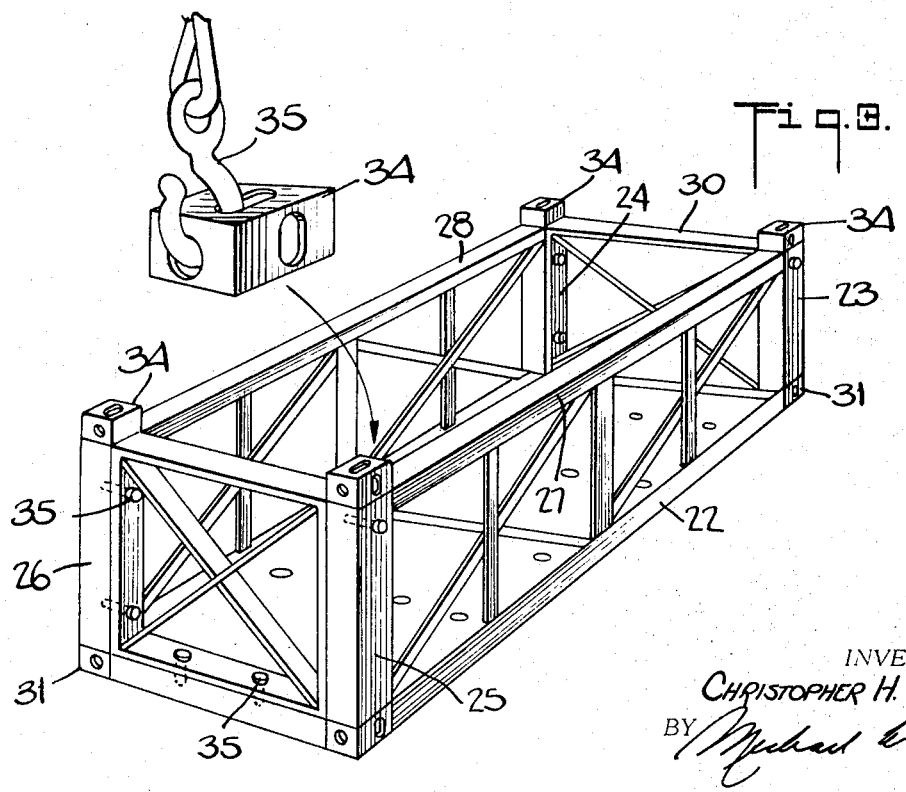
FIG. 2 illustrates in perspective one of the small cargo container units.

As pointed out previously, in undeveloped countries lacking modern highways, one must abandon the idea of moving twenty foot or longer containers. It becomes necessary to shrink the shipping unit to dimensions which can conveniently be transported over existing facilities. To this end, one suitable form of small shipping unit which is capable of being transported by small truck or by other means available in under-developed countries is shown in FIG. 2. This unit is a box-like container 20 supported on a pallet 21. The small container unit is not provided with corner fittings, for it is intended to be handled in the conventional way, by means for example of a fork-lift truck whose tines enter the spaces of the pallet.

While such handy-size container units are readily transportable by vehicles already available, or where highways do not exist by cargo planes, they cannot be loaded on containerships, for their dimensions are unsuitable and they lack corner fittings. On the other hand, if the small unit were handled by conventional bulk cargo vessels, the discharge of such vessels would be time consuming and would not result in a material improvement over existing means of transport.

Moreover not every item of cargo to be shipped would necessarily fit into a small container unit of the type described. Thus jeeps, ambulances, rifles, etc. cannot be placed in small container units and even if crated they cannot be handled by containerships. Thus the purpose of a demountable cargo gondola in accordance with the invention is to provide a cradle for small container units and for cargo items which cannot be put in such units, which gondola can be effectively handled in the same manner as a standard demountable cargo container, whereby small container units and other cargo items may be shipped by existing containerships.

Referring now to FIGS. 3 and 4, there is shown a demountable cargo gondola G in accordance with the invention, the gondola being constituted by a rectangular base or floor 22, having four extendible upright posts 23, 24, 25 and 26 secured to the corners thereof. The gondola includes two side walls 27 and 28 of truss-like construction, fixedly mounted between posts 23 and 25 and posts 24 and 26 respectively, and two removable end gates 29 and 30, mounted between posts 25 and 26 and posts 23 and 24 respectively.

Floor 22 is preferably of high strength and light weight sandwich construction and may be constituted by a honeycomb core filled with rigid foam plastic laminated between two facing sheets of steel or aluminum. Alternatively, it may take the form of an end-grain balsa wood core laminated between two sheets of plastic reinforced fiber glass. The floor may also be fabricated of extruded hollow aluminum vertical members forming a core sandwiched between sheets of aluminum.

At the base of each corner post is a bottom corner fitting, such as fitting 31, having the usual end, bottom and side openings. Such fittings, which may be fabricated from steel or aluminum castings, are of the type now employed in standard demountable cargo containers and are adapted for use for example with twist lock mountings which engage the fittings through the bottom openings, the mounting being secured to a flat bed trailer or welded to the deck of a vessel. The bottom corner fittings are also useable with lifting hardware or hooks.

Each of the corner posts, such as post 23 shown in FIG. 4, includes a lower section 23A of hollow construction, which is fixedly attached to the floor and to the side walls of the gondola, and an adjustable upper section 23B which is telescopically received in the main section to vary the height of the corner post so that the goods contained therein are always below the tops of the posts. The adjustment of section 23B may be effected by conventional jack mechanisms, by ratchet and pinion arrangements or other known means. For simplicity, the means for maintaining the adjusted height is shown in FIG. 4 as a retractable bolt 32 which is adapted to enter any one of a series of spaced holes 33 along the extendible section.

Secured to the top of the extendible section 23B is a top corner fitting 34, each of which has an end opening, a top opening and a side opening, the openings being differently shaped. These openings are adapted to accommodate hooks, shackles or other engaging pick-up devices. By way of illustration, a hook 35 is shown engaging the end opening in the top corner fitting, but it is to be understood that any other standard form of lifting hardware may be used. As shown in FIG. 1 the flying crane 19 is equipped with lifting hardware to raise a gondola or a container, the structure of the flying crane being such as to admit the lifted gondola or container into an open compartment.

End gates 29 and 30 are removably attached to the corner posts by means such as retractable bolts 35 which are received in the corner posts as well as in the floor 22.

It will be appreciated that various other expedients may be used to connect the end gates to the gondola. The floor has openings 36 therein for receiving hold-down straps where necessary.

In loading small container units, such as unit 21 onto the gondola, the end gates are removed and, as shown in FIG. 5, the units 21 are placed in side by side relation onto the floor of the gondola, four such units fitting within the gondola. The units are secured in place by hold-down straps 37, the corner post being raised to a position above the level of the units to prevent damage thereto in handling. The overall dimensions of the gondola is approximately 20 feet in length by 8 feet in width, the dimensions conforming to that of standard demountable cargo containers.

In FIG. 6, the gondola is shown carrying a load of cylindrical oil drums, 38, and it will be seen that the corner posts are fully retracted for the drums do not go above the height of the gates and side walls and are safey cradled therein. In FIG. 7 the gondola carries two vehicles 39 which are strapped to the floor, the corner posts being raised to their full height to protect the vehicles.

The removable end gates facilitate loading of the gondolas, for as shown in FIG. 8, when the gondolas are arranged in tandem relation with the gates removed, the gondolas then provide an unobstructed channel through which a fork lift truck can travel to deposit goods and to rapidly load the gondolas in successive order.

It will be appreciated that the demountable gondola in accordance with the invention is not only useful for loading goods onto containerships which are transported thereto in non-standardized form, but the gondola itself may be carried on trailers and other means presently available for transporting standardized demountable cargo containers, where such means are available, to provide an integrated mode of transportation. For example, in the case of oil drums as shown in FIG. 6, it is far simpler to load these in gondolas than in standard cargo containers inasmuch as the gondolas highest dimensions are adjustable to that of the drums, whereas a standard container has a fixed height and will have an unused free space above drums of ordinary height.

To facilitate hoisting of the gondolas by a cargo helicopter, a lifting frame LF is provided, as shown in FIG. 9, the frame being in an A formation and being dimensioned to accommodate and fit over a gondola G, with the four corners of the frame in registration with the bottom corner fittings of the gondola. The corners of the frame are provided with suitable coupling elements which can be linked readily to the corner fittings, whereby the gondola is locked thereto. The lifting frame is provided with a top ring which is engageable by a hook at the end of a hoisting cable which is reeled into the helicopter.

Because the gondola is open at the top, it can be top loaded rather than through the end gates. This is especially important for loading sheet steel, heavy machinery, vehicles and other items which cannot be admitted through the end gates. This advantage is lacking in conventional containers which can only be loaded through an end door. Thus the gondola is not only more versatile than a cargo container, but its dimensions are adjustable to the density of the cargo, whereas the container dimensions cannot be varied, with a resultant waste space.

The cells of a containership include vertical side rails of steel along which the gondolas slide when inserted therein or removed. Should the bottom and top corner fittings of the gondola also be of steel, the frictional engagement therebetween may give rise to sparks which would create a fire hazard, especially dangerous in the case of explosive cargoes. To avoid such sparks, the corner fittings may be sheathed or clad with a plastic material, such as urethane, or a non-sparking metal, such as aluminum.

It is to be noted that the open frame construction of the gondola makes possible a light weight structure. When for example, the floor, the corner fittings, gates and side walls are all made of aluminum, the entire weight of the gondola can be as low as 2000 pounds, whereas a typical cargo container of the same dimensions weighs as much as 5000 pounds. This weight factor is of particular significance when lifting the gondola with a flying crane.

While there has been shown a preferred embodiment of the invention, it will be obvious that many changes may be made therein without departing from the essential spirit of the invention as defined in the annexed claims.

What I claim is:

1. A demountable shipping gondola for loading assorted cargo into containerships having cells for accommodating standardized demountable cargo containers having predetermined dimensions, said gondola comprising:
   (a) a rectangular floor having length and width dimensions corresponding to that of a standardized container,
   (b) upright posts, mounted at the corners of said floor, each post having a lower section secured to the floor, and an upper section retractable within said lower section to vary the effective height of the post,
   (c) to bottom corner fitting secured to the base of each post and having openings therein to accommodate hardware for handling the gondola,
   (d) a top corner fitting secured to the upper end of the upper section of each post and having openings therein to accommodate hardware for handling the gondola,
   (e) a pair of side walls mounted along the sides of the floor between the lower sections of the posts, and
   (f) a pair of end gates mounted along the ends of the floor between the lower sections of the posts.

2. A gondola as set forth in claim 1 wherein said floor is of sandwich construction constituting a core having facing sheets laminated thereto.

3. A gondola as set forth in claim 1, wherein each post has a hollow lower section of rectangular cross section, with an upper section of rectangular cross section telescoping with the lower section, and further including means to maintain the upper section at any extended position.

4. A gondola as set forth in claim 1, wherein said top corner fittings have top, end and side openings of different shape, and said bottom corner fittings have bottom, end and side openings of different shape.

5. A gondola, as set forth in claim 1 wherein said end gates are removable to provide access to the gondola.

6. A gondola, as set forth in claim 1 wherein said side walls and end gates are of truss-like construction.

7. An integrated cargo transportation system for assorted cargo items some of which lend themselves to transport to a port via standardized demountable containers, other items being transportable in smaller container units, said system comprising:
   (a) a containership having a hold divided into cells dimensioned to accommodate said standardized containers, and
   (b) gondolas receivable within said cells, each gondola being adapted to cradle said other cargo items and having a floor, posts secured to the corners of said floor, the posts being adjustable in height to protect the cargo items, a pair of removable end gates, top corner fittings secured to the upper ends of the posts and bottom corner fittings secured to the bases of the posts, said fittings facilitating mechanical handling of the gondolas.

8. A system as set forth in claim 7, wherein said cells are defined by steel side rails along which said corner fittings slide, said corner fittings being coated with a non-sparking material.

9. A system as set forth in claim 7, further including a lifting frame which is receivable over a gondola and includes corner coupling elements which are attachable to the bottom corner fittings, which frame has an A configuration with a lifting ring on top thereof to facilitate removal of a gondola by a hook attached to the end of a hoisting cable.

References Cited

UNITED STATES PATENTS

| | | | |
|---|---|---|---|
| 1,694,912 | 12/1928 | Fitch | 214—38.42 |
| 2,056,179 | 10/1936 | Fitch | 214—38.42 |
| 2,063,651 | 12/1936 | Woodruff | 294—67.4 |
| 2,963,310 | 12/1960 | Abolins. | |
| 3,073,466 | 1/1963 | Greer et al. | 214—38.20 XR |

FOREIGN PATENTS

| | | |
|---|---|---|
| 573,060 | 12/1958 | Belgium. |
| 1,115,674 | 10/1961 | Germany. |

GERALD M. FORLENZA, *Primary Examiner.*

F. E. WERNER, *Assistant Examiner.*